UNITED STATES PATENT OFFICE.

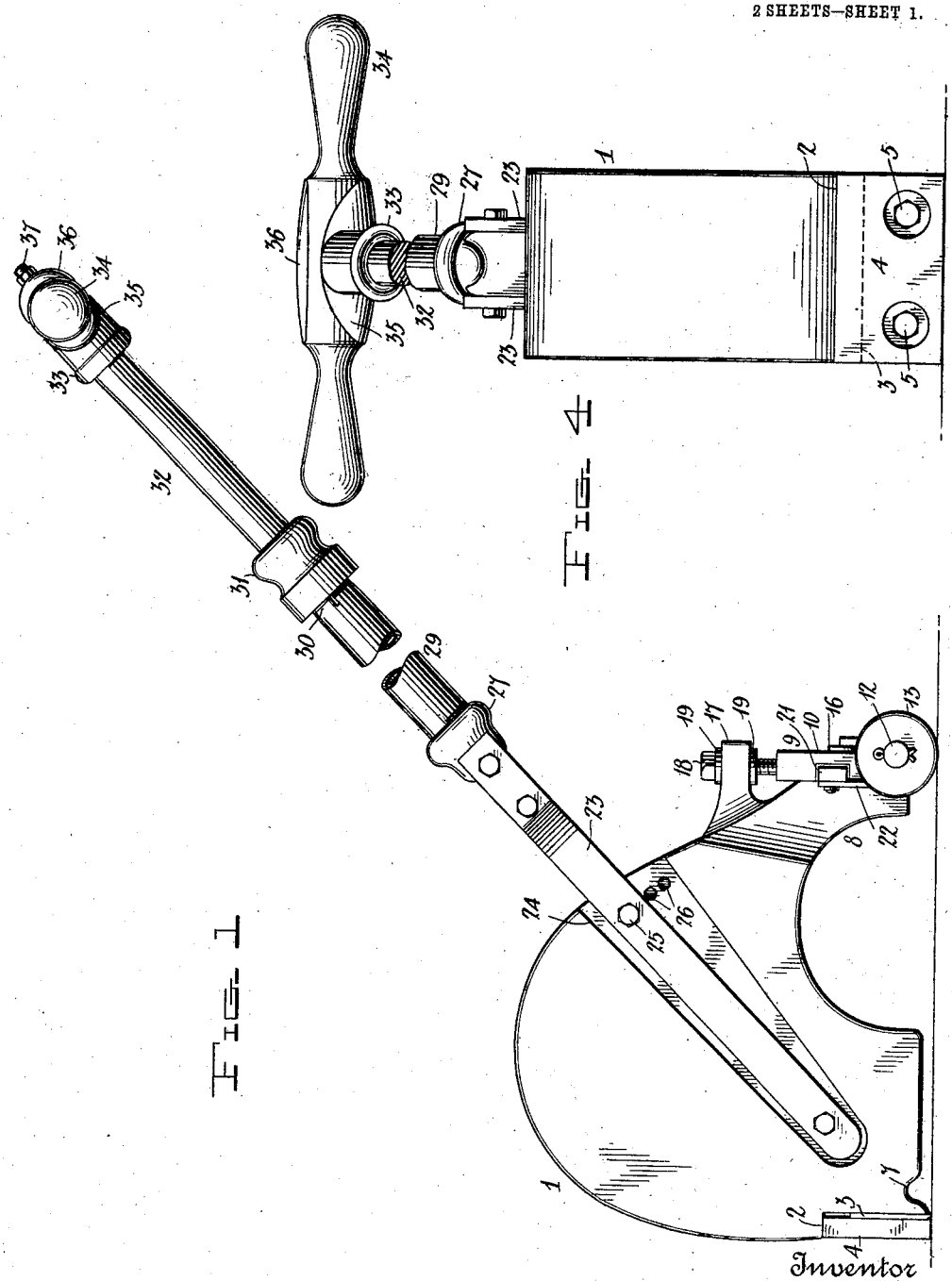

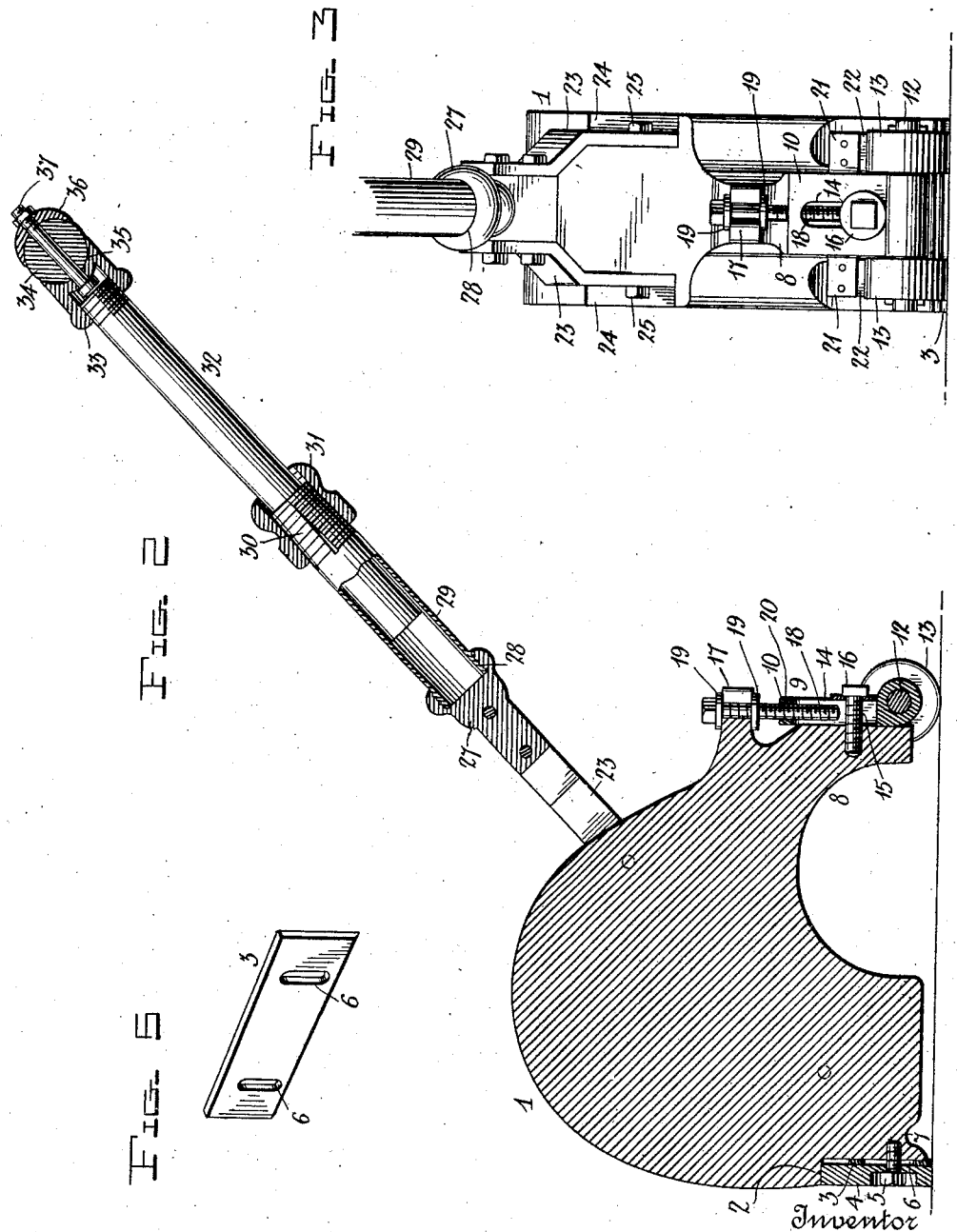

EDWIN P. SHANK, OF WELLS, MICHIGAN.

FLOOR-SCRAPER.

No. 859,697.  Specification of Letters Patent.  Patented July 9, 1907.

Application filed April 1, 1907. Serial No. 365,750.

*To all whom it may concern:*

Be it known that I, EDWIN P. SHANK, a citizen of the United States, residing at Wells, in the county of Delta and State of Michigan, have invented certain new and useful Improvements in Floor-Scrapers; and I do declare the following to be a full, clear, and exact description of the invention, such as will enable others skilled in the art to which it appertains to make and use the same.

This invention relates to improvements in floor scraping machines.

The object of the invention is to provide a machine of this character by means of which a floor may be quickly and easily scraped and smoothed off.

Another object of this invention is to provide a machine by means of which the labor and expense of scraping and dressing hard wood floors and other plain surfaces will be greatly reduced and to simplify the construction of machines and methods now generally in use for this class of work and whereby a smooth even surface may be produced on floors and other plain surfaces.

A further object is to provide a machine of this character which permits the operator to work in upright or standing position.

A further object is to provide a machine so arranged that the entire surface of the floor may be scraped except a very narrow margin along the base or washboard at the end of the scraped, this unscraped margin being covered by a strip of shoeing after the scraping is completed.

With the foregoing and other objects in view which will appear as the nature of the invention is better understood, the invention consists in certain novel features of construction, combination and arrangement of parts, as will be hereinafter fully described and claimed.

In the accompanying drawings, Figure 1 is a side view of a scraping machine constructed in accordance with the invention; Fig. 2 is a vertical longitudinal sectional view of the same; Fig. 3 is a rear view; Fig. 4 is a front view; and Fig. 5 is a detail perspective view of the knife or scraping blade.

Referring more particularly to the drawings, 1 denotes the body portion of the machine which is constructed of solid cast-iron to provide a weight for holding the scraping blade in an operative position on the floor or surface to be scraped. The body portion 1 is preferably formed in the shape shown in the drawings and is provided on its forward end adjacent to the lower side thereof with a right-angularly formed recess 2 adapted to form a seat for the scraping blade or knife 3 which is adjustably held in place therein by means of a clamping bar or plate 4, said plate being held in position to clamp the blade 3 by means of clamping screws 5 which are passed through apertures in said plate and are screwed into threaded sockets formed in the wall of the recesses 2 of the body portion 1. The plate 4 is provided with countersunk recesses to receive the heads of the screws 5 whereby when the latter are screwed up in operative position, the ends of the same lie flush with the outer side of the plate 4.

The knife or blade 3 is provided with vertically-disposed slots 6 through which the screws 5 are passed, thereby enabling the blade to be adjusted vertically between the clamping plate 4 and the wall of the recess 2, as will be understood. The clamping plate 4 secures the scraping blade in such manner as to prevent the quivering or vibrating of the blade which would cause a wavy or uneven surface to be formed by the blade.

The under side of the body portion 1 immediately in rear of the scraping blade is provided with a transversely disposed groove or recess 7 which provides a trough to receive the scrapings removed from the floor and thus prevent the clogging of the blade, the rear portion of the body 1 projects back in the form of an arm 8 upon which is adjustably mounted a supporting truck frame 9 which consists of a bearing plate 10 in the lower end of which is arranged a transversely-disposed axle 12 on the ends of which are revolubly mounted supporting rollers 13.

The plate 10 is provided with a central vertically-disposed slot 14 through which is inserted a sustaining bolt 15, the inner threaded end of which is adapted to be screwed into threaded sockets formed in the rear face of the arm 8. The bolt 15 is provided with a flanged head 16 which engages the outer side of the plate 10 thereby adjustably securing the arm 8 to the plate.

On the arm 8 is arranged a bifurcated bearing lug 17 in which is revolubly mounted an adjusting screw or bolt 18, said bolt being provided with retaining washers 19 which are arranged thereon above and below the bifurcated lug 17 thus preventing vertical movement of the bolt in said lug. The lower threaded end of the screw or bolt 18 is adapted to work in a threaded aperture 20 in the plate 10 whereby when said bolt is turned in one direction or the other the rear end of the body portion 1 will be raised or lowered to a greater or less degree on the scraping blade thereby bringing the lower rear edge of the clamping plate 4 into or out of engagement with the floor to regulate the depth of the cut formed by the scraping blade and to vary the angle at which said blade operates.

The bearing plate is provided with laterally-projecting lugs 21 to which are secured by means of screws or other suitable fastening devices the ends of scrapers 22 which are preferably formed of leather and are adapted to be engaged with the peripheries of the rollers 13 whereby all scrapings or other foreign matter may be removed from the peripheries of the rollers and prevented from marring or scratching the floor. The peripheries or working faces of the rollers 13 are preferably formed slightly convex while the outer edges or corners of the rollers are rounded off to prevent marring or scratching of the floor or articles in the room.

The machine is provided with a suitable handle which is preferably formed in a series of adjustable sections and consists of lower fastening bars 23 which are pivotally mounted at their lower ends in tapering recesses 24 formed in the opposite sides of the body 1 as shown. The bars 23 are adjustably connected to the body portion 1 adjacent to its outer edge by means of fastening bolts 25 which are passed through the apertures in said bars and are adapted to be screwed into engagement with any one of a series of holes 26 formed in the recesses 24 on the opposite sides of the body 1. By adjustably securing the upper portions of the bars 23, the handle may be supported at different angles. The upper ends of the bar 23 are bent inwardly and are bolted or otherwise secured to the coupling 27 in which is formed a threaded recess 28 to receive the threaded lower end of the tubular inner section 29 of the handle. The section 29 is tapered and threaded at its outer end and said end is split to form a series of clamping tongues 30.

Adapted to be screwed upon the split tapered end of the section 29 is a clamping nut 31 which when screwed inwardly is adapted to clamp said tongues into engagement with an outer cylindrical handle section 32, the inner end of which is adapted to be inserted into the tubular inner section of the handle and to be adjustably secured therein by means of the clamping nut 31, thus providing for the lengthening or shortening of the handle as may be desired. Screwed into engagement with the upper end of the outer handle section 32 is a head 33 in which is arranged a handle bar 34. The head 33 is provided with a curved flange or seat 35 to receive the handle bar 34 which is securely clamped therein by a curved clamping plate 36 formed to engage the outer side of the handle bar and through which said handle bar and the head 33 is arranged a fastening bolt 37. By thus mounting the handle bar 34 it may be turned at right angles or parallel to the wall of the room being scraped, thereby permitting the machine to be run close up to the mop-board along the walls of the room.

When it is desired to adjust or remove the cutting and scraping blade, the operator bears downwardly upon the handle, thus turning the forward part of the machine upwardly on the rollers 13 which will enable the removal of the clamping screws 5 and the adjusting of the scraping blade which after being adjusted is trued up by means of a strip of paste-board or other thin material of even thickness inserted beneath the clamping plate, thereby holding said plate and the body portion 1 upwardly above the floor and permitting the cutting or scraping blade to drop down until its working edge is in engagement with the floor or surface to be scraped, after which the screws 5 are tightened up to secure the blade in position.

In using the machine, the same is preferably drawn toward and pushed from the operator over the parts to be scraped until the surface of said parts is perfectly smooth and even. The edge of the scraping blade is permitted to engage the floor only while the machine is drawn toward the operator, the blade being lifted out of engagement with the floor or surface during the opposite movement of the machine by the lifting or tilting of the body portion on the rollers by a downward pressure upon the handle bar, as hereinbefore described. The clamping bar or plate 4 is adapted to serve as a gage to permit the engagement of the cutting edge of the scraping blade with the floor or surface to a greater or less degree. By adjusting the bolt 18, the rear end of the body portion is raised to a greater or less degree thereby regulating the angle at which the scraping blade is engaged with the floor, this adjustment also regulating to a certain degree the depth at which the knife is allowed to enter the floor or surface being scraped.

Having thus described my invention, what I claim as new is:—

1. In a floor scraping machine, a body portion, a scraping blade adjustably attached to one end thereof, a truck frame attached for vertical adjustment to the other end of the body, supporting wheels journaled in the truck frame, a vertical adjusting screw swiveled to the body above the truck frame and operatively engaged with the latter, and an operating handle attached to said body.

2. In a floor scraping machine, the combination with a body portion having formed in its outer end a blade engaging recess, a clamping plate adapted to support said blade in adjusted positions in said recess, a truck frame arranged at the opposite end of said body portion, supporting wheels mounted on said frame, means to adjustably connect said frame with the inner end of said body portion, an adjusting screw rotatably mounted on the latter and adapted to engage said truck frame by means of which said inner end of the body portion is raised or lowered, and an adjustable handle to operate said machine, substantially as described.

3. In a floor scraper, the combination with a weighted body portion having formed in its outer edge a bearing recess, a slotted scraping blade arranged in said recess, a clamping plate to engage said blade, clamping screws arranged in said plate and projected through the slots in said blade and screwed into the wall of said bearing recess and adjustably clamping said scraping blade therein, a truck frame arranged at the inner end of said body portion, said truck frame comprising a slotted plate, a fastening bolt arranged in said slot to adjustably secure said end of the body portion to said plate, a bifurcated bearing lug formed on said body portion, an adjusting screw rotatably engaged with said lug and adapted to be screwed into engagement with said plate whereby the inner end of said body portion is raised or lowered, an axle arranged on said plate, supporting rollers journaled on said axle, scrapers adapted to be engaged with said rollers to clean the same and an adjustably mounted operating handle connected to said body portion, substantially as described.

4. In a floor scraping machine, the combination with a weighted body portion having formed in its forward edge a bearing recess, and a trough to receive the scrapings from the floor, a scraping blade clamped in said bearing recess, a wheeled truck arranged at the opposite end of said body portion, means to adjustably secure said end in said truck, an operating handle comprising a pair of fastening bars pivotally mounted at their lower ends in tapered recesses formed in the opposite sides of said body portion, an adjusting bolt arranged in said fastening bars adjacent to the upper side of the body portion to adjustably secure said bars thereto, a coupling secured to the upper ends of said bars, a tubular inner handle section detachably engaged with said coupling, a series of tapered threaded clamping fingers on the outer end of said tubular section, a clamping nut arranged on said fingers, an outer handle section adjustably mounted in said tubular inner section and adapted to be secured in its adjusted position by said clamping nut and a handle bar mounted on the outer end of said outer section and adapted to be turned at different angles thereon, substantially as described.

In testimony whereof I have hereunto set my hand in presence of two subscribing witnesses.

EDWIN P. SHANK.

Witnesses:
 JOS. MACKIE,
 A. W. ROBERTS.